US009569429B2

(12) United States Patent
Reutov et al.

(10) Patent No.: US 9,569,429 B2
(45) Date of Patent: Feb. 14, 2017

(54) TRANSLATED NEWS

(75) Inventors: Mikhail Vladimirovich Reutov, Moscow (RU); Chen Ding, Santa Clara, CA (US); Lucian F. Cionca, Santa Clara, CA (US); Vadzim Bazuyeu, Moscow (RU); Awaneesh Verma, Mountain View, CA (US); Yaroslav Igorevich Kurovtsev, Yaroslavl (RU); Andre Rohe, Mountain View, CA (US); Dmitry Alekseevich Lizorkin, Moscow (RU); Dmitry Michailovich Chernenkov, Moscow (RU)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 14/376,244

(22) PCT Filed: Feb. 3, 2012

(86) PCT No.: PCT/RU2012/000059
§ 371 (c)(1),
(2), (4) Date: Jan. 12, 2015

(87) PCT Pub. No.: WO2013/115670
PCT Pub. Date: Aug. 8, 2013

(65) Prior Publication Data
US 2015/0120280 A1 Apr. 30, 2015

(51) Int. Cl.
*G06F 17/00* (2006.01)
*G06F 17/28* (2006.01)
*G06F 17/30* (2006.01)

(52) U.S. Cl.
CPC ..... *G06F 17/2836* (2013.01); *G06F 17/30011* (2013.01); *G06F 17/3053* (2013.01); *G06F 17/30598* (2013.01); *G06F 17/30867* (2013.01)

(58) Field of Classification Search
CPC ........ G06F 17/28; G06F 17/289; G06F 17/30; G06F 17/3002
(Continued)

(56) References Cited

U.S. PATENT DOCUMENTS 5,828,990 A * 10/1998 Nishino ................ G06F 17/289
704/2
8,346,536 B2 * 1/2013 Jiang ................. G06F 17/30669
704/2
(Continued)

OTHER PUBLICATIONS

PCT International Search Report dated Oct. 8, 2012 for PCT International Application No. PCT/RU2012/000059 (3 pages).

*Primary Examiner* — Daniel Abebe
(74) *Attorney, Agent, or Firm* — Remarck Law Group PLC (57) ABSTRACT

Methods, systems, and apparatus, including computer programs encoded on a computer storage medium, for augmenting clusters of news articles with translated news articles. In one aspect, a method includes obtaining data characterizing a first cluster of electronically published news articles in a presentation language, wherein the data characterizing the first cluster of news articles comprises one or more terms in the presentation language and region data identifying a first geographical region associated with the first cluster; generating translated terms by translating one or more of the terms from the presentation language to a first language, wherein the first language corresponds to the first geographical region; and obtaining one or more news articles in the first language in response to a search query derived from the one or more translated terms.

48 Claims, 5 Drawing Sheets

(58) Field of Classification Search
USPC .............................................................. 704/8
See application file for complete search history.

(56) References Cited

U.S. PATENT DOCUMENTS

| | | | |
|---|---|---|---|
| 2002/0002451 A1* | 1/2002 | Sukehiro | G06F 17/289 704/3 |
| 2002/0019826 A1* | 2/2002 | Tan | G06F 17/3071 |
| 2003/0105808 A1* | 6/2003 | Lee | H04L 29/06 709/203 |
| 2013/0041652 A1* | 2/2013 | Zuev | G06F 17/2755 704/8 |
| 2015/0106077 A1* | 4/2015 | Travieso | G06F 17/289 704/2 |

* cited by examiner

TRANSLATED NEWS

CROSS-REFERENCE TO RELATED APPLICATIONS

This application is a 371 U.S. National Stage of International Application No. PCT/RU2012/000059, filed Feb. 3, 2012. The disclosure of the above application is incorporated herein by reference in its entirety.

BACKGROUND

This specification relates to presenting electronic news articles.

A news service can cluster news articles that have been electronically published, e.g., on the Internet or directly to the news service, by various news sources. The news service crawls resources to identify news articles and clusters the news articles so that each cluster includes news articles that describe, report on, or are related to a respective news event. The news articles are clustered by language, so that a given cluster includes news articles in a particular language.

The news service maintains editions that are each targeted to a respective geographical region. Each edition includes one or more presentations of news articles that are targeted to the geographical region and are presented in a presentation language that corresponds to the geographical region, e.g., in one of the official languages of the geographical region. Each of the presentations identifies one or more highest-scoring news articles from one or more clusters of news articles in the presentation language. The news service can determine which edition is to be presented to a user based on, e.g., user preferences or the interface through which the user interacts with the news service. For example, if the user submits a query using an interface targeted to a particular geographical region, the news service can generate a presentation that is included in an edition targeted to that region in response to the query.

The news service can generate the presentations dynamically in response to received search queries that identify the edition to be searched, e.g., by populating the presentations with information that identifies news articles from clusters that match the search queries. The news service can score the news articles in the clusters and select the highest-scoring clusters for presentation. The news service can also maintain and update presentations that are directed to specific categories of news (e.g., top news, local news, or international news) and are populated with information that identifies news articles from clusters that match the specified categories.

The news articles in the clusters identified by presentations can be scored so that articles by publishers in the geographical region to which the edition is targeted are promoted. For example, the news articles identified in a presentation of a cluster of news articles that is targeted to Australia will tend to include more news articles published by Australian publishers than will be identified in a presentation of the cluster that is targeted to the United States. Similarly, the news articles identified in a presentation generated in response to a search query that specifies that an Australian edition is to be searched will tend to identify more articles from Australian publishers than will be identified in response to a search query that specifies that a United States edition is to be searched.

SUMMARY

This specification describes technologies relating to cross-lingual search and augmenting presentations of clusters of news articles with translated news articles.

A user viewing a presentation of news articles that is targeted to a particular geographical region may desire to obtain a local perspective on a news event from news sources in countries or regions relevant to the event, e.g., because media coverage by media outlets local to an event may portray the event differently than international news outlets. For example, a user viewing a presentation that is targeted to users from the United States may be interested in reading about a soccer match between a team from France and a team from the Netherlands taking place in Brazil. The user may desire to obtain information about the soccer match from one or more of French news sources, Dutch news sources, or Brazilian news sources to determine, e.g., whether the local media in those countries believe that the match was refereed fairly. The technologies described in this specification relate to systems, methods and computer programs, among other things, that operate to satisfy the desires of users for such information.

In general, one aspect of the subject matter described in this specification can be embodied in methods that include the actions of obtaining data characterizing a first cluster of electronically published news articles in a presentation language, wherein the data characterizing the first cluster of news articles comprises one or more terms in the presentation language and region data identifying a first geographical region associated with the first cluster; generating translated terms by translating one or more of the terms from the presentation language to a first language, wherein the first language corresponds to the first geographical region; and obtaining one or more news articles in the first language in response to a search query derived from the one or more translated terms.

These and other aspects can optionally include one or more of the following features. The method can further include: determining that the first language corresponding to the first geographical region is different from the presentation language. Obtaining one or more news articles in the first language can include: obtaining one or more news results in response to the search query, wherein each news result identifies a respective second cluster of news articles in the first language and one or more news articles in the respective second cluster; and selecting the one or more news articles from the news articles identified by the news results. The first cluster can be one of a plurality of clusters in the presentation language defined by a news service, and the data characterizing the first cluster can be obtained from the news service. Each of the second clusters can be one of a plurality of clusters in the first language defined by the news service. The search query derived from the one or more translated terms can specify an edition to be searched, and the edition can be maintained by the news service. Selecting one or more news articles from the news articles identified by the news results can include: identifying a highest-scoring cluster from among the second clusters according to respective scores assigned to each of the second clusters; and selecting one or more news articles from the highest-scoring cluster of news articles. The method can further include: determining that the score assigned to the highest-scoring cluster exceeds a specified threshold value. The method can further include: generating a news result for the first cluster of news articles, wherein the news result for the first cluster of news articles includes data identifying each of the one or more obtained news articles. The method can further include: transmitting the news result to a client device for presentation to a user. The data identifying each of the one or more obtained news articles can include a link to a machine translation of the obtained news article. The data identifying each of the one or more obtained news articles can include a link that, when selected by a user of a client device, initiates a request to a translation service for a machine translation of the obtained news article from the first language into the presentation language. The data identifying each of the one or more obtained news articles can include a translation of a title of the obtained news article from the first language into the presentation language. The method can further include: obtaining a respective machine translation from the first language to the presentation language of each of one or more of the obtained news articles; and for each of the machine translations, determining that the machine translation does not sufficiently match any news article in the first cluster of news articles. Determining that the machine translation does not sufficiently match any news article in the first cluster of news articles can include determining that at least one of a title of the machine translation and a snippet of text from the machine translation are not substantially similar to a title and a corresponding snippet of text of any news article in the first cluster of news articles. The search query derived from the one or more translated terms can include each of the one or more translated terms and data specifying at least one of a date range or a minimum size for clusters identified by news results obtained in response to the search query.

Particular embodiments of the subject matter described in this specification can be implemented so as to realize one or more of the following advantages. Users can be provided with relevant search results from corpora including content, e.g., news articles, in multiple languages upon submitting a query in a single language in an automated manner. Particular embodiments can be implemented in a bandwidth and memory efficient manner. Users can be provided with a comprehensive view of news events, particularly if the events occur in a country with little international news coverage. Users who speak one language can easily obtain a local perspective on a news event that occurs in a region whose media primarily publish news articles in languages other than that language. For a given foreign news event, users can be given a local perspective by easily being able to read news articles published by publishers local to the event. Publishers can reach a wider audience without needing to translate their news articles into multiple languages. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
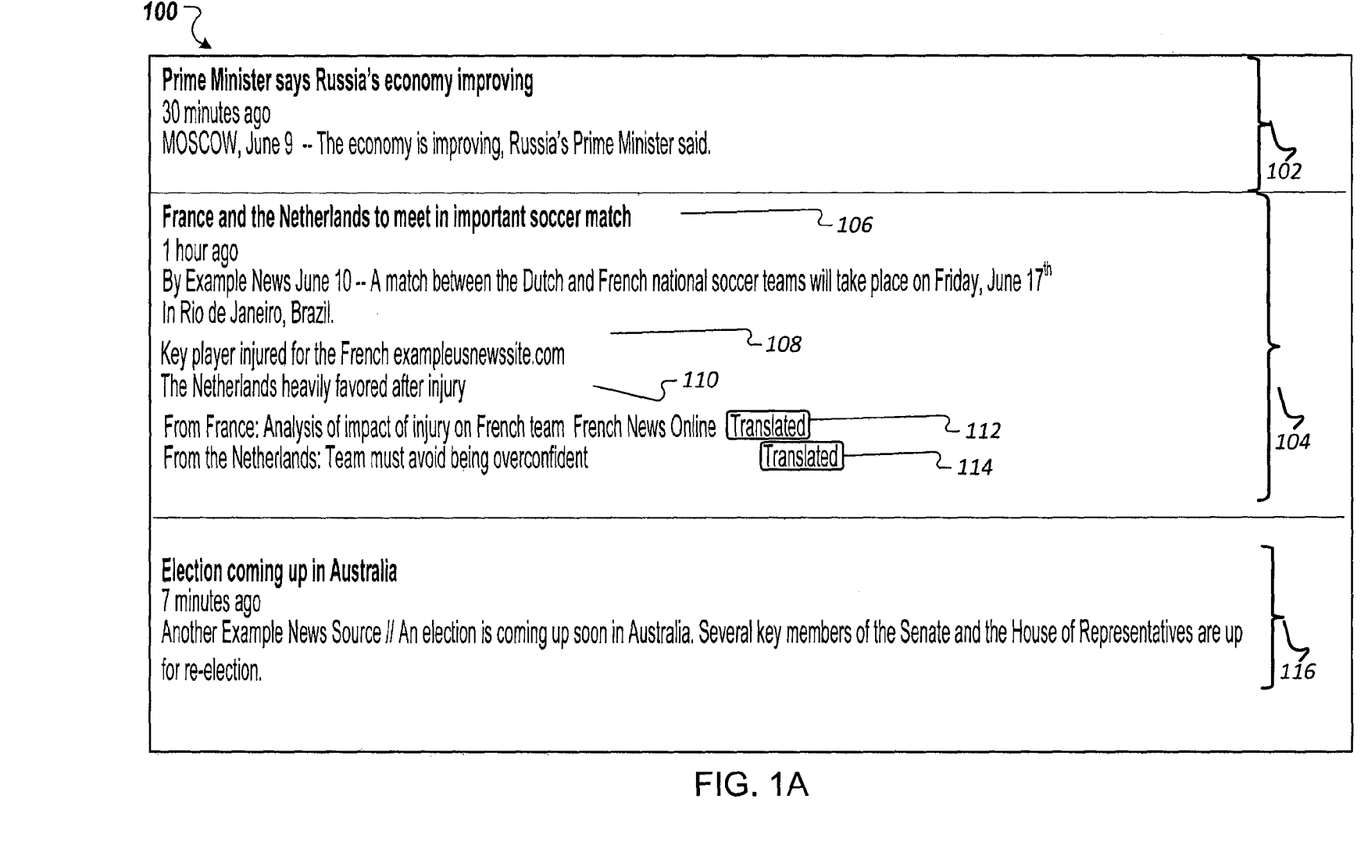
FIG. 1A illustrates a portion of an example news presentation.

FIG. 1A illustrates a portion 100 of an example news presentation. The example news presentation can be, for example, a Hypertext Markup Language (HTML) web page, an Extensible Markup Language (XML) page, a Portable Document Format (PDF) file, and so on. The portion 100 shows news results 102, 104, and 116 that each identify one or more news articles from respective clusters of news articles. The news results have been selected for inclusion in the example news presentation by a news service. The news articles are clustered so that the news articles in a cluster describe, report on, or are related to the same news event.

The news presentation is targeted to a particular geographical region. That is, the news service populates the news presentation with news results that are likely to be of interest to users associated with that geographical region, e.g., users in, from, or interested in the geographical region. For example, the geographical region can be a city, a country, a state, or other area comprising one or more geographical locations (e.g., the San Francisco Bay Area or the Middle East). In some implementations, the news presentation is included in an edition maintained by the news service that is targeted to the particular geographical region.

The news service can dynamically generate the news presentation and transmit it to a client device for presentation in response to a search query submitted by a user of the client device, e.g., a search query submitted through an interface provided to the client device by the news service. The client device can be, for example, a personal computer, a mobile communication device, or another device that can send and receive data over a network. The news results included in the news presentation can be news results that the news service has determined match the search query.

Alternatively, the news presentation may be directed to a specific category of news, e.g., top news, domestic news, international news, sports news, financial news, and so on. In these cases, the news results included in the news presentation can be news results that the news service has determined match the specific category of news.

Each of the news results 102, 104, and 116 identifies news articles from a respective cluster of news articles, with each cluster including news articles in a presentation language appropriate for the geographic region to which the particular news presentation is targeted. In particular, the example news presentation of FIG. 1 is targeted to a geographic region for which English is a corresponding language, e.g., the United States, Great Britain, or California. As a result, each of the news results 102, 104, and 116 shown in the portion 100 of the example news presentation identifies a cluster of news articles that are in English.

A news result can include snippets of text from each of one or more news articles in a cluster of news articles, links to one or more news articles in the cluster, images that are related to the news event to which the news articles in the cluster relate, and so on. The links can be links to web pages maintained by the news sources that publish the news articles that include the full text of the respective news articles.

In particular, the news result 104 included in the portion 100 identifies a cluster that includes news articles about an upcoming soccer match between France and the Netherlands. The news result 104 includes links to and snippets from news articles about the match from various electronic publishers, e.g., newspapers, magazines, online news agencies, and so on. The news result 104 identifies news articles 106, 108, and 110 that are included in the cluster. The news result 104 also identifies and includes links 112 and 114 to two translated news articles. The translated news articles are news articles that were originally written in languages corresponding to geographical regions relevant to the soccer match, e.g., French or Dutch, but that were translated into English and included in the news result 104 by the news service. Alternatively, the links 112 and 114 may be links to a translation service that, when selected by a user, initiate a request to the translation service to obtain translations of the articles from their original languages into another language, e.g., English. That is, although the titles of the articles are translated into English and included in the news result 104 by the news service, the news article may not be translated until a user submits a request to the translation service by selecting one of the links 112 or 114.

Figure 1B:
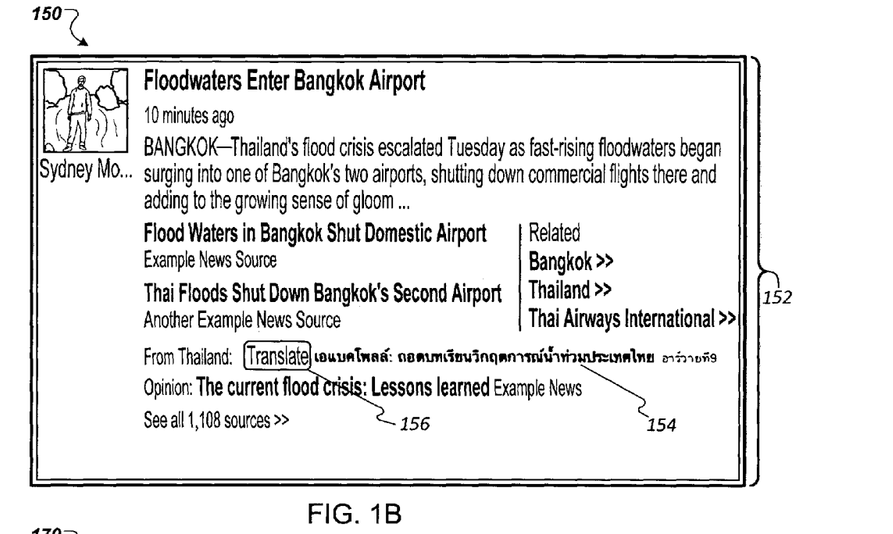
FIG. 1B illustrates a portion of an example news presentation.

FIG. 1B illustrates a portion 150 of an example news presentation. The portion 150 shows a news result 152 that identifies a cluster that includes news articles about flooding in the country of Thailand. While the cluster of news articles contains news articles in English, i.e., the language that matches the language of the geographical region to which the news presentation is targeted, the news result 152 also identifies and includes a link to a news article 154 written in the language corresponding to Thailand, the region where the flooding is occurring. While the news article 154 is not included in the cluster of English-language articles about the flooding in Thailand, the news article 154 was identified as being relevant to the news event and included in the news result 152 by the news service. The news result 152 also includes a user interface element 156 that, when selected by a user, causes the displayed title of the news article 154 to be translated into English. Selection of the user interface element can also modify the link to the news article 154, e.g., so that selection of the link by a user initiates a request to obtain a translation of the article from its original language into English from a translation service.

Figure 1C:
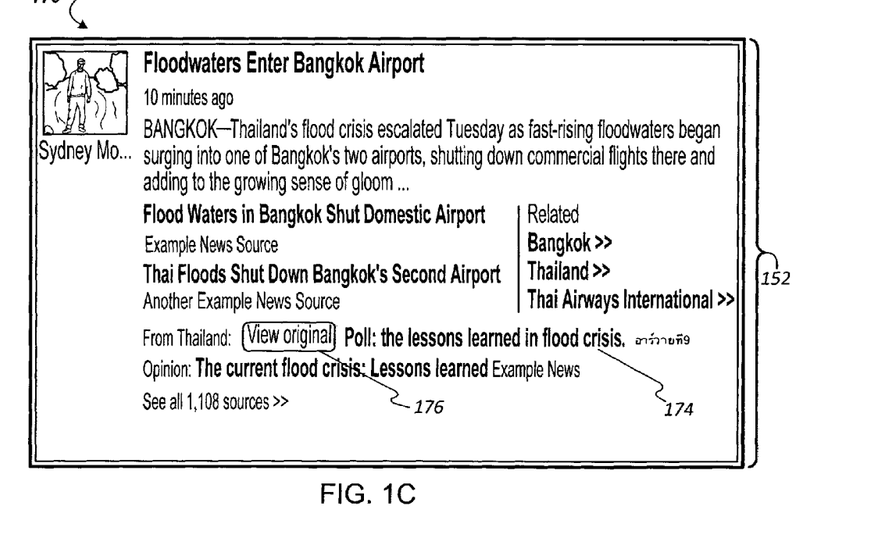
FIG. 1C illustrates a portion of an example news presentation.

FIG. 1C illustrates a portion 170 of an example news presentation. The portion 170 shows the news result 152 of FIG. 1B. However, a user has selected a user interface element that caused the client device to display a translated title 174 instead of the original title of the news article 154 of FIG. 1B. Additionally, the link to the news article 154 has been modified so that selection of the link by a user initiates a request to obtain a translation of the article from its original language into the presentation language from a translation service. The news result 152 also includes a user interface element 176 that, when selected by a user, restores the displayed title to the title in the original language and restores the link to a link to the original version of the news article 154.

Figure 2:
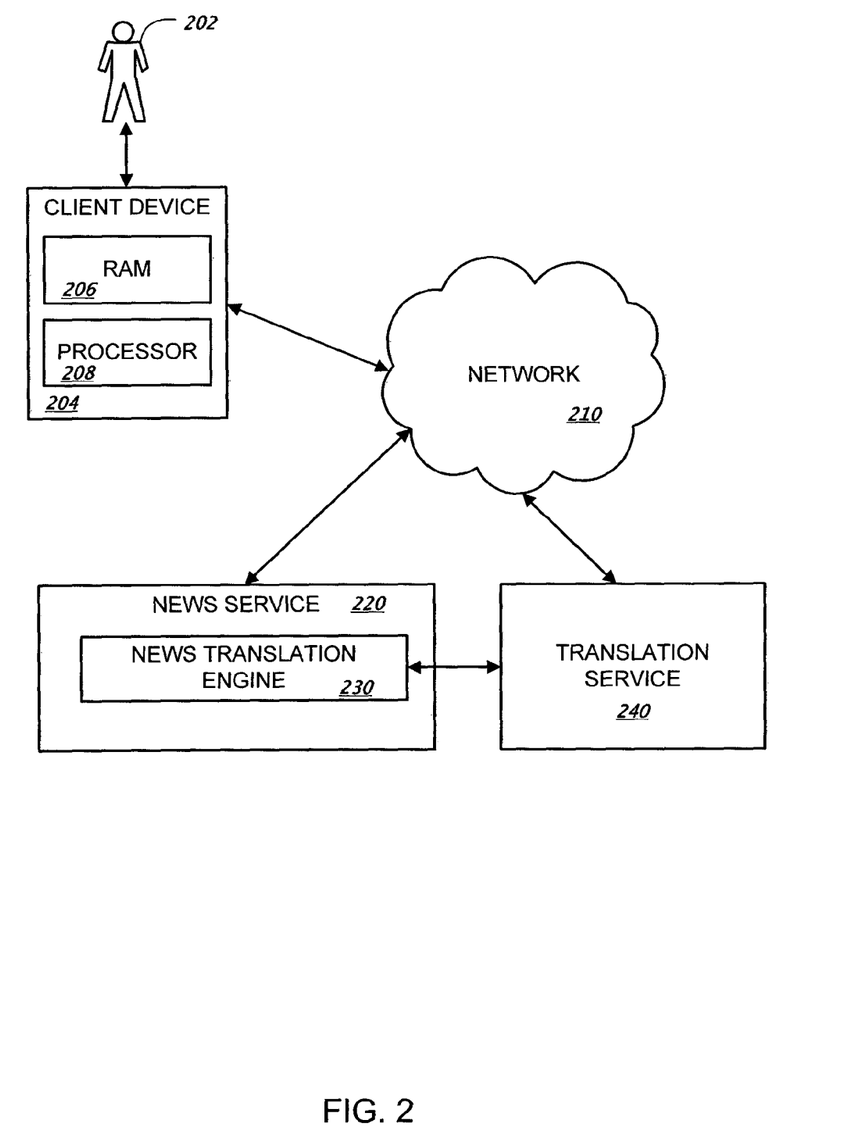
FIG. 2 is a block diagram showing an example news service in a context of use.

FIG. 2 is a block diagram showing an example news service 220 in a context of use. The news service 220 can be implemented as, for example, one or more computer programs installed on a system of one or more computers in one or more locations that are coupled to each other through a network.

A user 202 can communicate with the news service 220 through a client device 204. For example, the client device 204 can be a data processing apparatus coupled to the news service 220 through a data communication network 210. The network 210 can include, for example, a local area network (LAN), a wireless network, or wide area network (WAN), e.g., the Internet. The client device 204 will generally include a random access memory (RAM) 206 and a processor 208. The client device 204 will also generally include a software application, e.g., a web browser or other communication software, to facilitate the sending and receiving of data over the network.

The news service 220 maintains clusters of news articles in one or more languages. The news service 220 can maintain clusters of news articles for multiple languages, with each cluster including articles in a single language. That is, the news service may maintain one cluster of news articles that describe a particular event in one language and another cluster of articles that describe the event in another language. The news service 220 also maintains one or more editions, with each edition being targeted to a respective geographical region. Each edition includes one or more presentations of news articles generated by the news service 220 that are targeted to the geographical region and are presented in a presentation language that is appropriate for the geographical region. For example, the presentation language can be one of the official languages of the geographical region.

The user 202 can submit a query to the news service 220. When the user 202 submits a query, the query is transmitted through the network 210 to the news service 220. The news service 220 performs a search to identify clusters of news articles that match the query. The news service 220 assigns scores to the clusters of news articles that match the query. The news service 220 also assigns scores to articles in the clusters that match the query. The news service 220 responds to the query by generating news results, which are transmitted through the network to the client device 204 for presentation to the user 202, e.g., as a news presentation to be displayed in a web browser running on the client device 204. Each news result identifies a respective cluster of news articles and one or more articles included in the cluster. The identified articles can be, e.g., the articles that rank the highest according to their assigned scores.

The news service 220 generates and stores data that characterizes each cluster of news articles. For example, the data can include one or more geographical regions and one or more keywords associated with each cluster of news articles. The geographical regions are regions that are relevant to the news event to which the news articles in the cluster relate, e.g., the geographical region where the news event occurred or the geographical regions that are relevant to one or more entities involved in the news event. For example, for a cluster of news articles that relate to a soccer match in Brazil between a team from France and a team from the Netherlands, the geographical regions associated with the cluster can include France, the Netherlands, and Brazil. Similarly, the one or more keywords associated with the cluster are terms that relate to the news event to which the news articles in the cluster relate. The associated keywords can be ranked, e.g., so that the highest-ranked keywords are the keywords that the news service has determined best represent the news event. In some implementation, the data also includes a range of dates, e.g., a range of dates between which a threshold proportion of the news articles in the cluster were published. As news articles are added or removed from a given cluster, the news service 220 can update the data characterizing the cluster.

The news service 220 also includes or can communicate with a news translation engine 230. For one or more of the clusters maintained by the news service 220, the news translation engine 230 can select news articles about the news event to which the news articles in the cluster relate that are written in a language different from the language of the cluster to be included in a news result identifying the cluster. Selecting these news articles will be described in more detail below with reference to FIG. 3. In some implementations, the news service 220 can determine whether to include news articles in other languages in each news result included in one or more of the news presentations maintained by the news service 220. For example, when generating a top news presentation that is part of a particular edition, the news service 220 can also determine whether news articles in languages other than the language corresponding to the edition should be included in any of the news results identified in the top news presentation.

In order to select news articles in other languages, the translated news engine 230 can communicate with a translation service 240. The translation service 240 is a service that provides machine translations, e.g., statistical machine translations, of text from a source language into one or more target languages. The translated news engine 230 can provide, for example, the text of a news article or the title of the news article in a source language and data identifying a target language to the translation service 240 and obtain a machine translation of the text of the news article or of the title into the target language from the translation service 240. Alternatively, the translated news engine 230 can provide data identifying the target language and data identifying a news article, e.g., a resource locator associated with the news article, to the translation service 240.

In some implementations, the user 202 of the client device 204 can communicate with the translation service 240 through the network 210 to obtain machine translations of news articles. For example, the user 202 can select a link included in a news presentation provided by the news service 220 in order to transmit a request to the translation service 240 through the network 210 for a translation of a news article from a source language to the language of the news presentation. In addition, the news presentation can include a user interface element that, when selected by the user 202, causes the client device 204 to obtain and display a translation of a portion of a news article, e.g., the title of the news article, a snippet from the news article, or both, from the translation service 240. This can reduce the required bandwidth by limiting the amount of data that is transferred to the client device.

Figure 3:
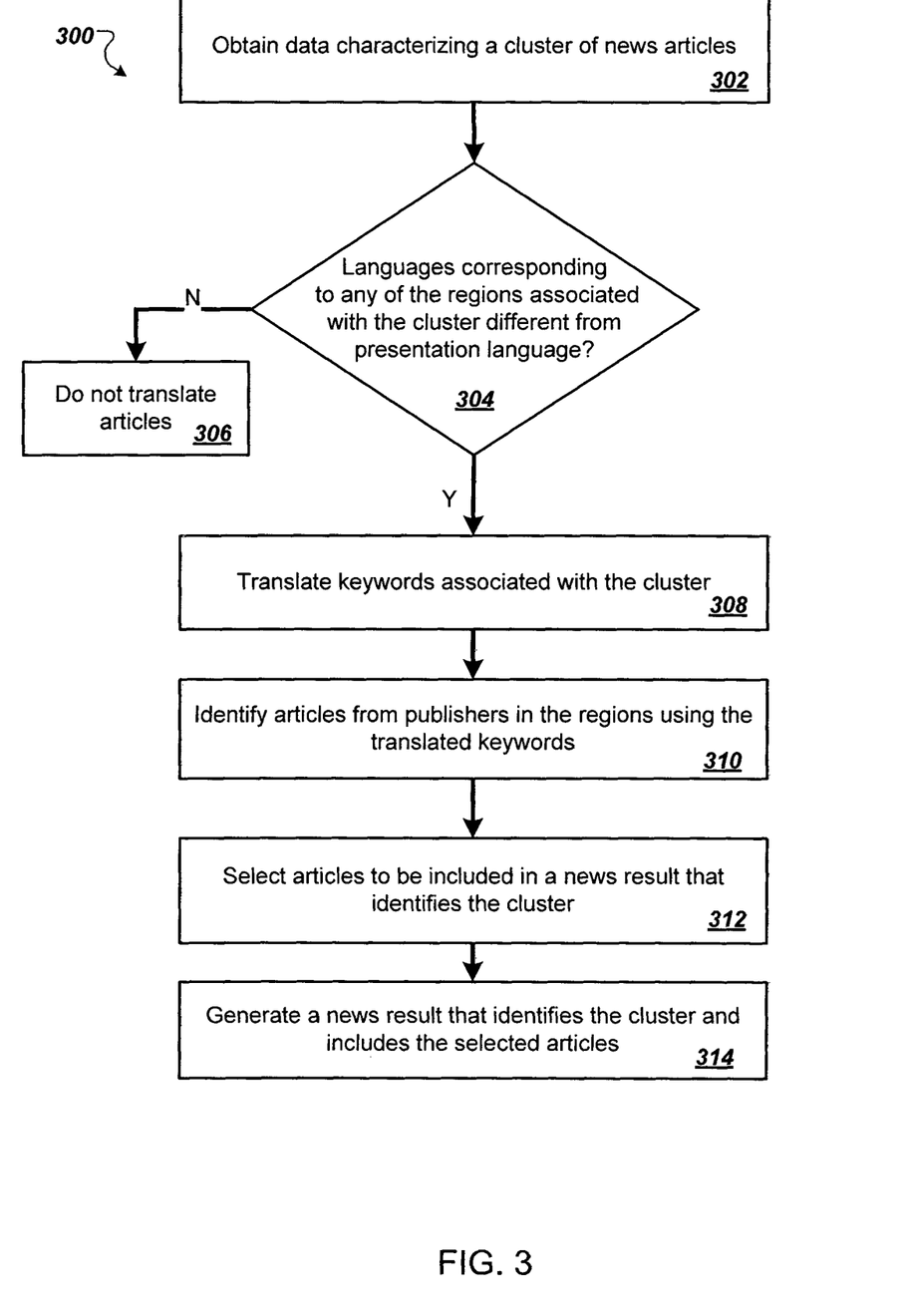
FIG. 3 is a flow diagram of an example process for selecting news articles in other languages to be included in a news result identifying a cluster of news articles.

FIG. 3 is a flow diagram of an example process 300 for selecting news articles in other languages to be included in a news result identifying a cluster of news articles. For convenience, the process 300 will be described with respect to a system of one or more computers located in one or more locations that performs the process 300. For example, a news service, e.g., news service 220 of FIG. 2, can be used to perform the process 300.

The system obtains data characterizing a cluster of news articles from a news service (step 302). The cluster of news articles includes articles in a presentation language. The obtained data includes one or more keywords associated with the cluster of news articles and the names of one or more geographical regions associated with the cluster. The obtained keywords can be ranked, e.g., placed in an order, so that the highest-ranked keywords are the keywords that the news service has determined best represent the news event. In some implementations, the data characterizing the cluster also includes a range of dates that correspond to the news event to which the news articles in the cluster relate. The cluster can be a cluster that is selected for inclusion in a news presentation.

The system can determine whether languages corresponding to any of the geographical regions associated with the cluster are different from the presentation language (step 304). The languages corresponding to a particular geographical region can be, for example, languages associated (by the news service or by users) with the geographic region. For example, Russian can be associated with one or more of Russia, because it is an official language of Russia, and Ukraine, e.g., because it is used in Ukraine by a threshold number of users or is commonly associated by users with Ukraine although it is not the official language of Ukraine.

If none of the languages corresponding to the geographical regions associated with the cluster differ from the presentation language, the system determines not to add any translated news articles to the cluster of news articles (step 306).

If any of the languages corresponding to the geographical regions associated with the cluster differ from the language of the news articles in the cluster, the system translates one or more of the keywords associated with the cluster into those languages (step 308). The system can select the keywords that are to be translated from the obtained keywords based on the ranking of the keywords. For example, the system can obtain translations for each keyword whose rank is higher than a predetermined threshold rank. The translations can be obtained from a translation service, e.g., the translation service 240 of FIG. 2.

In some implementations, the system can maintain or have access to data that identifies, for pairs of geographical regions, a likelihood that news sources from one region in the pair will have a different perspective on news events than news sources from the other region in the pair. This data can be generated, e.g., using conventional machine learning techniques. In these implementations, if the cluster is to be included in a news presentation targeted to a particular geographical region, the system accesses the data to determine the likelihood that news sources from any of the geographical regions associated with the cluster have a different perspective on events than news sources from the geographical region to which the news presentation is targeted. If the likelihoods for any of the geographical regions are below a specified threshold value, the system can determine not to include translations into languages corresponding to those geographical regions in the cluster.

Using the translated keywords, the system identifies news articles from publishers in the regions (step 310). For example, for each language into which the keywords are translated, the system can generate a search query that is derived from the translations of the keywords in that language. The system can then identify news articles in that language from search results received in response to the search query. The system can receive search results for each of the generated search queries from a search service. For example, the search service can be a general search engine that searches and scores indexed resources. Alternatively, the search can be a search performed by the news service that identifies clusters of news articles maintained by the news service. An example process for using search queries derived from translated keywords to identify news articles is described below with reference to FIG. 4.

The system selects news articles to be included in a news result identifying the cluster of news articles (step 312). The system selects the news articles from the identified news articles based on, e.g., scores assigned to the news articles by the service from which the search results were obtained. In some implementations, if none of the news articles obtained in response to a particular search query have an assigned score that exceeds a predetermined threshold value, the system determines not to identify any news articles obtained in response to that search query in the news result.

The system generates a news result that identifies the cluster and includes the selected articles (step 314). For example, the news result can identify one or more news articles in the cluster in the presentation language and the selected news articles. The news result identifying the cluster can then be transmitted through the network to a client device for presentation to a user, e.g., as part of a news presentation to be displayed in a web browser running on the client device.

In some implementations, the system obtains machine translations of the selected news articles into the presentation language from a translation service. For example, the system can provide data identifying a news article, e.g., a resource locator, e.g., a URL, for the news article, to the translation service and obtain a machine translation of the news article into the presentation language. Alternatively, the system can provide the text of the selected news articles to the translation service and obtain translated text in the presentation language. In these implementations, the news result identifying the cluster can include links to the machine translations of the selected articles. The link to the machine translation can be presented with information specifying that it is a translation from a news article in a particular source language and identifying the geographical region to which the source language corresponds.

In some other implementations, the system obtains translations of a portion of each selected article, e.g., the title of the article or a snippet of text from the article. In these implementations, the news result can include the translated title, the translated snippet of text, or both of the selected article, as well as a link that, when selected by a user, causes a request to be submitted to the translation service to obtain a translation of the article from the original language to the presentation language.

In some implementations, prior to including one of the selected news articles in the news result, the system determines whether the machine translation of each selected news article sufficiently matches a news article already included in the cluster of news articles. If the translation is a match, the system does not include the article in news result. For example, the system can compare the translated title of each machine translation to the titles of the news articles in the cluster. If the title of a machine translation substantially matches the title of a news article in the cluster, the system can compare a snippet of text from the machine translation to a corresponding snippet of text from the news article in the cluster. If the two snippets sufficiently match, the system determines that the two news articles sufficiently match and refrains from including the news article in the news result that identifies the cluster. This can not only enhance the quality of search results, i.e., news results, presented to a user but can also reduce memory space needed to store a cluster of news articles and save bandwidth when transmitting news articles of the cluster to a client device.

By using process 300, the system can provide for an improved automated cross-lingual search. The system can provide relevant search results, e.g., news results that identify relevant news articles, from corpora in multiple languages to a user upon submitting a query in a single language in an automated fashion.

Figure 4:
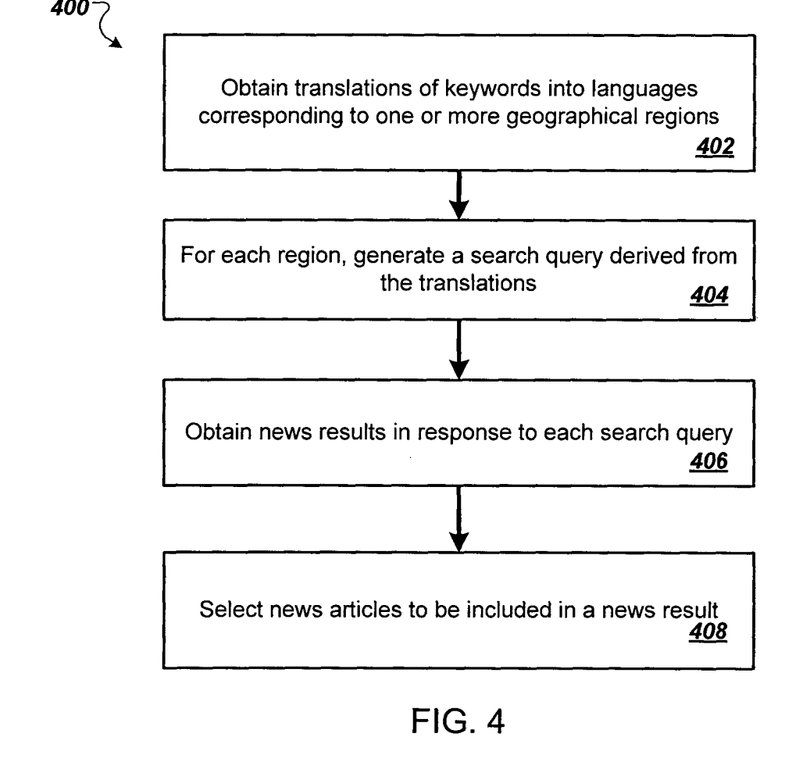
FIG. 4 is a flow diagram of an example process for selecting news articles

FIG. 4 is a flow diagram of an example process 400 for selecting news articles. For convenience, the process 400 will be described with respect to a system of one or more computers located in one or more locations that performs the process 400. For example, a news service, e.g., news service 220 of FIG. 2, can be used to perform the process 400.

The system obtains translations of one or more keywords associated with a cluster of news articles from a, presentation language of the cluster to each regionally-related language, i.e., each language that differs from the presentation language and that corresponds to one or more geographical regions associated with the cluster of news articles (step 402).

For each regionally-related language, the system generates a search query derived from the translations of the keywords into that language (step 404). The search query is a query for news articles included in clusters of news articles maintained by the news service. For a given language, the search query can include each of the translations of the keywords into that language. Optionally, the search query also specifies one or more additional search parameters.

For example, the search query can specify a date range, e.g., the date range indicated by data characterizing the cluster, so that the response to the query will identify news articles published within the specified date range. As another example, the search query can specify a minimum size for clusters of news articles obtained in response to the search query. For example, the search query may specify that each returned cluster must include at least a minimum number of news articles.

As another example, the search query can specify a geographical region to which news results obtained in response to the query should be relevant. If the news service maintains multiple editions, the search query can specify the edition to which the news results are to be targeted, e.g., the edition that corresponds to the geographical region for which the query is generated. In some implementations, if no edition exists that corresponds to one or more of the geographical regions associated with the cluster, the system determines not add translated articles from publishers in that region to the cluster.

The system obtains news results in response to each of the search queries (step 406). As described above, the news results each identify one or more news articles from a respective cluster of news articles defined by the news service. The obtained news results are ranked, e.g., according to scores assigned to the respective clusters of news articles by the news service in response to the search query. In some implementations, if none of the clusters identified by news results obtained in response to a particular query have a score that exceeds a threshold value, the system discards the news results obtained in response to that query.

The system selects news articles to be included in a news result that identifies the cluster (step 408). If only one search query was generated, the system can select a specified number of highest-ranking news articles in the cluster identified by the highest-ranked news result for the query. If news results were obtained for multiple search queries, the system can, for example, identify a cluster of news articles having a highest score from among all of the clusters identified by the news results obtained for all of the queries. The system can then select a number of highest-ranking news articles from that cluster. Alternatively, the system can select a number of highest-ranked news articles from the highest-scoring cluster returned in response to each search query. The number of news articles selected can be a predetermined number.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described.

Although the present invention is defined in the attached claims, it is to be understood that the invention can alternatively also be defined in accordance with the following embodiments:

1. A method performed by a system comprising one or more computers, the method comprising:
   obtaining data characterizing a first cluster of electronically published news articles in a presentation language, wherein the data characterizing the first cluster of news articles comprises one or more terms in the presentation language and region data identifying a first geographical region associated with the first cluster;
   generating translated terms by translating one or more of the terms from the presentation language to a first language, wherein the first language corresponds to the first geographical region; and
   obtaining one or more news articles in the first language in response to a search query derived from the one or more translated terms.

2. The method of embodiment 1, further comprising:
   determining that the first language corresponding to the first geographical region is different from the presentation language.

3. The method of any of embodiments 1 or 2, wherein obtaining one or more news articles in the first language comprises:
   obtaining one or more news results in response to the search query, wherein each news result identifies a respective second cluster of news articles in the first language and one or more news articles in the respective second cluster; and
   selecting the one or more news articles from the news articles identified by the news results.

4. The method of any of embodiments 1 to 3, wherein the first cluster is one of a plurality of clusters in the presentation language defined by a news service, and wherein the data characterizing the first cluster is obtained from the news service.

5. The method of any of embodiments 2 to 4, wherein each of the second clusters is one of a plurality of clusters in the first language defined by the news service.

6. The method of any of embodiments 1 to 5, wherein the search query derived from the one or more translated terms specifies an edition to be searched, and wherein the edition is maintained by the news service.

7. The method of any of embodiments 1 to 6, wherein selecting one or more news articles from the news articles identified by the news results comprises:
   identifying a highest-scoring cluster from among the second clusters according to respective scores assigned to each of the second clusters; and
   selecting one or more news articles from the highest-scoring cluster of news articles.

8. The method of embodiment 7, further comprising:
   determining that the score assigned to the highest-scoring cluster exceeds a specified threshold value.

9. The method of any of embodiments 1 to 8, further comprising:
   generating a news result for the first cluster of news articles, wherein the news result for the first cluster of news articles includes data identifying each of the one or more obtained news articles.

10. The method of embodiment 9, further comprising:
    transmitting the news result to a client device for presentation to a user.

11. The method of any of embodiments 9 or 10, wherein the data identifying each of the one or more obtained news articles comprises a link to a machine translation of the obtained news article.

12. The method of any of embodiments 9 to 11, wherein the data identifying each of the one or more obtained news articles comprises a link that, when selected by a user of a client device, initiates a request to a translation service for a machine translation of the obtained news article from the first language into the presentation language.

13. The method of any of embodiments 9 to 12, wherein the data identifying each of the one or more obtained news articles comprises a translation of a title of the obtained news article from the first language into the presentation language.

14. The method of any of embodiments 1 to 13, further comprising:
    obtaining a respective machine translation from the first language to the presentation language of each of one or more of the obtained news articles; and
    for each of the machine translations, determining that the machine translation does not sufficiently match any news article in the first cluster of news articles.

15. The method of embodiment 14, wherein determining that the machine translation does not sufficiently match any news article in the first cluster of news articles comprises determining that at least one of a title of the machine translation and a snippet of text from the machine translation are not substantially similar to a title and a corresponding snippet of text of any news article in the first cluster of news articles.

16. The method of any of embodiments 1 to 15, wherein the search query derived from the one or more translated terms includes each of the one or more translated terms and data specifying at least one of a date range or a minimum size for clusters identified by news results obtained in response to the search query.

17. A system comprising one or more computers and one or more storage devices, the one or more storage devices storing instructions that, when executed by the one or more computers, cause the one or more computers to perform operations comprising:
  obtaining data characterizing a first cluster of electronically published news articles in a presentation language, wherein the data characterizing the first cluster of news articles comprises one or more terms in the presentation language and region data identifying a first geographical region associated with the first cluster;
  generating translated terms by translating one or more of the terms from the presentation language to a first language, wherein the first language corresponds to the first geographical region; and
  obtaining one or more news articles in the first language in response to a search query derived from the one or more translated terms.

18. The system of embodiment 17, the operations further comprising:
  determining that the first language corresponding to the first geographical region is different from the presentation language.

19. The system of any of embodiments 17 or 18, wherein obtaining one or more news articles in the first language comprises:
  obtaining one or more news results in response to the search query, wherein each news result identifies a respective second cluster of news articles in the first language and one or more news articles in the respective second cluster; and
  selecting the one or more news articles from the news articles identified by the news results.

20. The system of any of embodiments 17 to 19, wherein the first cluster is one of a plurality of clusters in the presentation language defined by a news service, and wherein the data characterizing the first cluster is obtained from the news service.

21. The system of any of embodiments 19 or 20, wherein each of the second clusters is one of a plurality of clusters in the first language defined by the news service.

22. The system of any of embodiments 17 to 21, wherein the search query derived from the one or more translated terms specifies an edition to be searched, and wherein the edition is maintained by the news service.

23. The system of any of embodiments 19 to 22, wherein selecting one or more news articles from the news articles identified by the news results comprises:
  identifying a highest-scoring cluster from among the second clusters according to respective scores assigned to each of the second clusters; and
  selecting one or more news articles from the highest-scoring cluster of news articles.

24. The system of embodiment 23, the operations further comprising:
  determining that the score assigned to the highest-scoring cluster exceeds a specified threshold value.

25. The system of any of embodiments 17 to 24, the operations further comprising:
  generating a news result for the first cluster of news articles, wherein the news result for the first cluster of news articles includes data identifying each of the one or more obtained news articles.

26. The system of claim 25, the operations further comprising:
  transmitting the news result to a client device for presentation to a user.

27. The system of any of embodiments 25 to 26, wherein the data identifying each of the one or more obtained news articles comprises a link to a machine translation of the obtained news article.

28. The system of any of embodiments 25 to 27, wherein the data identifying each of the one or more obtained news articles comprises a link that, when selected by a user of a client device, initiates a request to a translation service for a machine translation of the obtained news article from the first language into the presentation language.

29. The system of any of embodiments 25 to 28, wherein the data identifying each of the one or more obtained news articles comprises a translation of a title of the obtained news article from the first language into the presentation language.

30. The system of any of embodiments 17 to 29, the operations further comprising:
  obtaining a respective machine translation from the first language to the presentation language of each of one or more of the obtained news articles; and
  for each of the machine translations, determining that the machine translation does not sufficiently match any news article in the first cluster of news articles.

31. The system of embodiment 30, wherein determining that the machine translation does not sufficiently match any news article in the first cluster of news articles comprises determining that at least one of a title of the machine translation and a snippet of text from the machine translation are not substantially similar to a title and a corresponding snippet of text of any news article in the first cluster of news articles.

32. The system of any of embodiments 17 to 31, wherein the search query derived from the one or more translated terms includes each of the one or more translated terms and data specifying at least one of a date range or a minimum size for clusters identified by news results obtained in response to the search query.

33. A computer storage medium encoded with a computer program, the program comprising instructions that when executed by one or more computers cause the one or more computers to perform operations according to any of embodiments 1 to 16.

Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. What is claimed is:

The invention claimed is:

1. A method performed by a system comprising one or more computers, the method comprising:
  receiving a query for electronically published news articles, the query being in a presentation language;
  identifying at least one particular cluster of a plurality of clusters matching the query, wherein each cluster of the plurality of clusters comprises one or more electronically published news articles and wherein the one or more news articles in each cluster are in the same presentation language;

obtaining data characterizing the particular cluster of news articles in the presentation language, wherein the data characterizing the particular cluster of news articles comprises one or more terms in the presentation language and region data identifying at least one first geographical region associated with the particular cluster;

identifying one or more region languages corresponding to the at least one first geographical region;

determining whether each of the one or more region languages differs from the presentation language;

when a particular region language differs from the presentation language:
generating translated terms by translating the one or more of the terms from the presentation language to the particular region language, and
obtaining one or more news articles in the particular region language in response to a search query derived from the one or more translated terms.

2. The method of claim 1, wherein obtaining one or more news articles in the particular region language comprises:
obtaining one or more news results in response to the search query, wherein each news result identifies a respective second cluster of news articles in the particular region language and one or more news articles in the respective second cluster; and
selecting the one or more news articles from the news articles identified by the news results.

3. The method of claim 2, wherein the plurality of clusters is defined by a news service, and wherein the data characterizing the particular cluster is obtained from the news service.

4. The method of claim 3, wherein each of the second clusters is one of the plurality of clusters and is in the particular region language.

5. The method of claim 4, wherein the search query derived from the one or more translated terms specifies an edition to be searched, and wherein the edition is maintained by the news service.

6. The method of claim 2, wherein selecting one or more news articles from the news articles identified by the news results comprises:
identifying a highest-scoring cluster from among the second clusters according to respective scores assigned to each of the second clusters; and
selecting one or more news articles from the highest-scoring cluster of news articles.

7. The method of claim 6, further comprising:
determining that the score assigned to the highest-scoring cluster exceeds a specified threshold value.

8. The method of claim 1, further comprising:
generating a news result for the particular cluster of news articles, wherein the news result for the particular cluster of news articles includes data identifying each of the one or more obtained news articles.

9. The method of claim 8, further comprising:
transmitting the news result to a client device for presentation to a user.

10. The method of claim 8, wherein the data identifying each of the one or more obtained news articles comprises a link to a machine translation of the obtained news article.

11. The method of claim 8, wherein the data identifying each of the one or more obtained news articles comprises a link that, when selected by a user of a client device, initiates a request to a translation service for a machine translation of the obtained news article from the particular region language into the presentation language.

12. The method of claim 8, wherein the data identifying each of the one or more obtained news articles comprises a translation of a title of the obtained news article from the particular region language into the presentation language.

13. The method of claim 1, further comprising:
obtaining a respective machine translation from the particular region language to the presentation language of each of one or more of the obtained news articles; and
for each of the machine translations, determining that the machine translation does not sufficiently match any news article in the particular cluster of news articles.

14. The method of claim 13, wherein determining that the machine translation does not sufficiently match any news article in the particular cluster of news articles comprises determining that at least one of a title of the machine translation and a snippet of text from the machine translation are not substantially similar to a title and a corresponding snippet of text of any news article in the particular cluster of news articles.

15. The method of claim 1, wherein the search query derived from the one or more translated terms includes each of the one or more translated terms and data specifying at least one of a date range or a minimum size for clusters identified by news results obtained in response to the search query.

16. The method of claim 1, further comprising, when the particular region language does not differ from the presentation language:
generating a news result for the particular cluster of news articles, wherein the news result for the particular cluster does not include articles in a language different from the presentation language.

17. A system comprising one or more computers and one or more storage devices, the one or more storage devices storing instructions that, when executed by the one or more computers, cause the one or more computers to perform operations comprising:
receiving a query for electronically published news articles, the query being in a presentation language;
identifying at least one particular cluster of a plurality of clusters matching the query, wherein each cluster of the plurality of clusters comprises one or more electronically published news articles and wherein the one or more news articles in each cluster are in the same presentation language;
obtaining data characterizing the particular cluster of news articles in the presentation language, wherein the data characterizing the particular cluster of news articles comprises one or more terms in the presentation language and region data identifying at least one first geographical region associated with the particular cluster;
identifying one or more region languages corresponding to the at least one first geographical region;
determining whether each of the one or more region languages differs from the presentation language;
when a particular region language differs from the presentation language:
generating translated terms by translating the one or more of the terms from the presentation language to the particular region language, and
obtaining one or more news articles in the particular region language in response to a search query derived from the one or more translated terms.

18. The system of claim 17, wherein obtaining one or more news articles in the particular region language comprises:
  obtaining one or more news results in response to the search query, wherein each news result identifies a respective second cluster of news articles in the particular region language and one or more news articles in the respective second cluster; and
  selecting the one or more news articles from the news articles identified by the news results.

19. The system of claim 18, wherein the plurality of clusters is defined by a news service, and wherein the data characterizing the particular cluster is obtained from the news service.

20. The system of claim 19, wherein each of the second clusters is one of the plurality of clusters and is in the particular region language.

21. The system of claim 20, wherein the search query derived from the one or more translated terms specifies an edition to be searched, and wherein the edition is maintained by the news service.

22. The system of claim 18, wherein selecting one or more news articles from the news articles identified by the news results comprises:
  identifying a highest-scoring cluster from among the second clusters according to respective scores assigned to each of the second clusters; and
  selecting one or more news articles from the highest-scoring cluster of news articles.

23. The system of claim 22, the operations further comprising:
  determining that the score assigned to the highest-scoring cluster exceeds a specified threshold value.

24. The system of claim 17, the operations further comprising:
  generating a news result for the particular cluster of news articles, wherein the news result for the particular cluster of news articles includes data identifying each of the one or more obtained news articles.

25. The system of claim 24, the operations further comprising:
  transmitting the news result to a client device for presentation to a user.

26. The system of claim 24, wherein the data identifying each of the one or more obtained news articles comprises a link to a machine translation of the obtained news article.

27. The system of claim 24, wherein the data identifying each of the one or more obtained news articles comprises a link that, when selected by a user of a client device, initiates a request to a translation service for a machine translation of the obtained news article from the particular region language into the presentation language.

28. The system of claim 24, wherein the data identifying each of the one or more obtained news articles comprises a translation of a title of the obtained news article from the particular region language into the presentation language.

29. The system of claim 17, the operations further comprising:
  obtaining a respective machine translation from the particular region language to the presentation language of each of one or more of the obtained news articles; and
  for each of the machine translations, determining that the machine translation does not sufficiently match any news article in the particular cluster of news articles.

30. The system of claim 29, wherein determining that the machine translation does not sufficiently match any news article in the particular cluster of news articles comprises determining that at least one of a title of the machine translation and a snippet of text from the machine translation are not substantially similar to a title and a corresponding snippet of text of any news article in the particular cluster of news articles.

31. The system of claim 17, wherein the search query derived from the one or more translated terms includes each of the one or more translated terms and data specifying at least one of a date range or a minimum size for clusters identified by news results obtained in response to the search query.

32. The system of claim 17, the operations further comprising, when the particular region language does not differ from the presentation language:
  generating a news result for the particular cluster of news articles, wherein the news result for the particular cluster does not include articles in a language different from the presentation language.

33. A non-transitory computer storage medium encoded with a computer program, the program comprising instructions that when executed by one or more computers cause the one or more computers to perform operations comprising:
  receiving a query for electronically published news articles, the query being in a presentation language;
  identifying at least one particular cluster of a plurality of clusters matching the query, wherein each cluster of the plurality of clusters comprises one or more electronically published news articles and wherein the one or more news articles in each cluster are in the same presentation language;
  obtaining data characterizing the particular cluster of news articles in the presentation language, wherein the data characterizing the particular cluster of news articles comprises one or more terms in the presentation language and region data identifying at least one first geographical region associated with the particular cluster;
  identifying one or more region languages corresponding to the at least one first geographical region;
  determining whether each of the one or more region languages differs from the presentation language;
  when a particular region language differs from the presentation language:
    generating translated terms by translating the one or more of the terms from the presentation language to the particular region language, and
    obtaining one or more news articles in the particular region language in response to a search query derived from the one or more translated terms.

34. The computer storage medium of claim 33, wherein obtaining one or more news articles in the particular region language comprises:
  obtaining one or more news results in response to the search query, wherein each news result identifies a respective second cluster of news articles in the particular region language and one or more news articles in the respective second cluster; and
  selecting the one or more news articles from the news articles identified by the news results.

35. The computer storage medium of claim 34, wherein the plurality of clusters is defined by a news service, and wherein the data characterizing the particular cluster is obtained from the news service.

36. The computer storage medium of claim 35, wherein each of the second clusters is one of the plurality of clusters and is in the particular region language.

37. The computer storage medium of claim 36, wherein the search query derived from the one or more translated terms specifies an edition to be searched, and wherein the edition is maintained by the news service.

38. The computer storage medium of claim 34, wherein selecting one or more news articles from the news articles identified by the news results comprises:
   identifying a highest-scoring cluster from among the second clusters according to respective scores assigned to each of the second clusters; and
   selecting one or more news articles from the highest-scoring cluster of news articles.

39. The computer storage medium of claim 38, the operations further comprising:
   determining that the score assigned to the highest-scoring cluster exceeds a specified threshold value.

40. The computer storage medium of claim 33, the operations further comprising:
   generating a news result for the particular cluster of news articles, wherein the news result for the particular cluster of news articles includes data identifying each of the one or more obtained news articles.

41. The computer storage medium of claim 40, the operations further comprising:
   transmitting the news result to a client device for presentation to a user.

42. The computer storage medium of claim 40, wherein the data identifying each of the one or more obtained news articles comprises a link to a machine translation of the obtained news article.

43. The computer storage medium of claim 40, wherein the data identifying each of the one or more obtained news articles comprises a link that, when selected by a user of a client device, initiates a request to a translation service for a machine translation of the obtained news article from the particular region language into the presentation language.

44. The computer storage medium of claim 40, wherein the data identifying each of the one or more obtained news articles comprises a translation of a title of the obtained news article from the particular region language into the presentation language.

45. The computer storage medium of claim 33, the operations further comprising:
   obtaining a respective machine translation from the particular region language to the presentation language of each of one or more of the obtained news articles; and
   for each of the machine translations, determining that the machine translation does not sufficiently match any news article in the particular cluster of news articles.

46. The computer storage medium of claim 45, wherein determining that the machine translation does not sufficiently match any news article in the particular cluster of news articles comprises determining that at least one of a title of the machine translation and a snippet of text from the machine translation are not substantially similar to a title and a corresponding snippet of text of any news article in the particular cluster of news articles.

47. The computer storage medium of claim 33, wherein the search query derived from the one or more translated terms includes each of the one or more translated terms and data specifying at least one of a date range or a minimum size for clusters identified by news results obtained in response to the search query.

48. The computer storage medium of claim 33, the operations further comprising, when the particular region language does not differ from the presentation language:
   generating a news result for the particular cluster of news articles, wherein the news result for the particular cluster does not include articles in a language different from the presentation language.

\* \* \* \* \*